US012025159B2

(12) United States Patent
Tian et al.

(10) Patent No.: US 12,025,159 B2
(45) Date of Patent: Jul. 2, 2024

(54) HYDRAULIC POWER SYSTEM FOR DOWNHOLE DEVICE AND DOWNHOLE DEVICE

(71) Applicants: CHINA OILFIELD SERVICES LIMITED, Tianjin (CN); CHINA NATIONAL OFFSHORE OIL CORPORATION, Beijing (CN)

(72) Inventors: Zhibin Tian, Hebei (CN); Yongren Feng, Hebei (CN); Tao Lu, Hebei (CN); Lin Huang, Hebei (CN); Tiemin Liu, Hebei (CN); Zanqing Wei, Hebei (CN); Yong Jiang, Hebei (CN); Xiaoqiang Du, Hebei (CN); Liping Liu, Hebei (CN); Xiaodong Chu, Hebei (CN)

(73) Assignees: China Oilfield Services Limited, Tianjin (CN); China National Offshore Oil Corporation, Beijing (CN)

( * ) Notice: Subject to any disclaimer, the term of this patent is extended or adjusted under 35 U.S.C. 154(b) by 262 days.

(21) Appl. No.: 17/630,653

(22) PCT Filed: Dec. 3, 2019

(86) PCT No.: PCT/CN2019/122702
§ 371 (c)(1),
(2) Date: Jan. 27, 2022

(87) PCT Pub. No.: WO2021/082169
PCT Pub. Date: May 6, 2021

(65) Prior Publication Data

US 2022/0260094 A1 Aug. 18, 2022

(30) Foreign Application Priority Data

Nov. 1, 2019 (CN) ........................ 201911060617.1

(51) Int. Cl.
*F15B 11/17* (2006.01)
*F15B 11/028* (2006.01)
(Continued)

(52) U.S. Cl.
CPC ............ *F15B 11/17* (2013.01); *F15B 11/028* (2013.01); *F15B 11/04* (2013.01); *F15B 20/00* (2013.01);
(Continued)

(58) Field of Classification Search
CPC ..... F15B 11/04; F15B 11/042; F15B 11/0423; F15B 11/0426; F15B 11/17; F15B 20/004;
(Continued)

(56) References Cited

U.S. PATENT DOCUMENTS 2,917,896 A * 12/1959 De Buigne ............. F15B 11/16 269/30
3,379,006 A 4/1968 Eickmann
(Continued)

FOREIGN PATENT DOCUMENTS

CN 101184923 A 5/2008
CN 102808731 A 12/2012
(Continued)

OTHER PUBLICATIONS

First Office Action for Chinese Application No. 201911060617.1, dated Jul. 3, 2020, 23 Pages (including English translation).
(Continued)

*Primary Examiner* — Michael Leslie
(74) *Attorney, Agent, or Firm* — Brooks Kushman, P.C.

(57) ABSTRACT

A hydraulic power system for a downhole device, including a first motor, a first hydraulic pump, a second hydraulic pump, a first main oil circuit, a second main oil circuit, a switching control module and a first execution module. The
(Continued)

first motor has a first output shaft which drives the first hydraulic pump and has an oil outlet connected to an input end of the first main oil circuit and a second output shaft which drives the second hydraulic pump and has an oil outlet connected to an input end of the second main oil circuit; the first execution module is connected to an output end of the first main oil circuit; displacement of the first hydraulic pump is smaller than that of the second hydraulic pump; and the switching control module is connected between the first main oil circuit and the second main oil circuit.

12 Claims, 6 Drawing Sheets

(51) Int. Cl.
*F15B 11/04* (2006.01)
*F15B 20/00* (2006.01)

(52) U.S. Cl.
CPC ... *F15B 20/004* (2013.01); *F15B 2211/20515* (2013.01); *F15B 2211/20576* (2013.01); *F15B 2211/20584* (2013.01); *F15B 2211/20592* (2013.01); *F15B 2211/75* (2013.01)

(58) Field of Classification Search
CPC .. F15B 2211/20515; F15B 2211/20584; F15B 2211/20592
See application file for complete search history.

(56) References Cited

U.S. PATENT DOCUMENTS

| | | | | | |
|---|---|---|---|---|---|
| 3,754,394 | A * | 8/1973 | Morrison | F15B 11/17 60/486 |
| 4,008,571 | A * | 2/1977 | Evans | F15B 11/08 60/423 |
| 10,041,508 | B2 * | 8/2018 | Schmollngruber | F15B 13/06 |
| 11,118,328 | B2 * | 9/2021 | Shimizu | E02F 9/2285 |
| 11,339,811 | B2 * | 5/2022 | Stefani | F15B 11/17 |
| 2006/0266210 | A1 | 11/2006 | Zhang et al. | |
| 2006/0277905 | A1 | 12/2006 | Matsumoto | |
| 2013/0000292 | A1 | 1/2013 | Edler et al. | |
| 2016/0138392 | A1 | 5/2016 | Pomerantz et al. | |
| 2019/0277311 | A1 | 9/2019 | Verho | |
| 2019/0345692 | A1 | 11/2019 | Saitoh et al. | |

FOREIGN PATENT DOCUMENTS

| | | | |
|---|---|---|---|
| CN | 203113417 | U | 8/2013 |
| CN | 203978266 | U | 12/2014 |
| CN | 104373120 | A | 2/2015 |
| CN | 107084164 | A | 8/2017 |
| CN | 109237013 | A | 1/2019 |
| CN | 110050130 | A | 7/2019 |
| CN | 110242629 | A | 9/2019 |
| EA | 020824 | B1 | 2/2015 |
| RU | 160236 | U1 | 3/2016 |
| RU | 2579540 | C2 | 4/2016 |
| RU | 2700971 | C2 | 9/2019 |
| WO | 2018179863 | A1 | 10/2018 |

OTHER PUBLICATIONS

Second Office Action for Chinese Application No. 201911060617.1, dated Jan. 6, 2021, 24 Pages (including English translation).
International Search Report for Application No. PCT/CN2019/122702, dated Aug. 7, 2020, 4 Pages (including English translation).
Decision to Grant for Russian Application No. 2022103077/12, dated Sep. 28, 2022, 22 Pages (including English Translation).

* cited by examiner

HYDRAULIC POWER SYSTEM FOR DOWNHOLE DEVICE AND DOWNHOLE DEVICE

TECHNICAL FIELD

The present disclosure relates to, but is not limited to, the technical field of geological exploration, in particular to a hydraulic power system for a downhole device and a downhole device.

BACKGROUND

Some downhole devices used for geological exploration and testing have high requirements on control of force and speed due to particularity of the operating environment and operating requirements. For example, in order to improve the adaptability of a coring instrument to a formation, higher control accuracy of drilling pressure and advancing speed of a bit is required during operation of a large-diameter coring instrument. Moreover, a variation range of the drilling pressure and speed is very wide under different working conditions. When coring in a complex formation, the requirements on the control of the drilling pressure and the speed are higher.

However, the existing hydraulic system cannot meet the requirements on the control of force and speed in downhole operations. For example, the current hydraulic system cannot fully meet the requirements on the drilling pressure and the drilling speed in large-diameter coring operations, and the bit is easily stuck in the coring process. When the sticking occurs, a force for retracting the bit is small, and a speed of the retracting is slow, which easily damage the coring instrument. Moreover, the drilling speed cannot be effectively controlled, resulting in low coring efficiency. In addition, reliability of the current hydraulic system is generally poor. Once there is a problem, it will seriously affect operation performance of coring instruments. Due to the insufficient performance of the current hydraulic system, it often leads to the sticking of downhole instruments, such as stuck bit and irretrievable bit, and instrument salvaging will seriously waste time and costs.

SUMMARY

The following is a summary of subject matters described in detail herein. This summary is not intended to limit the protection scope of the claims.

The present application provides a hydraulic power system for downhole device and a downhole device, which may realize effective control of force and speed in downhole operation.

In one aspect, the present application provides a hydraulic power system for a downhole device, including a first motor, a first hydraulic pump, a second hydraulic pump, a first main oil path, a second main oil path, a switching control module and a first execution module; the first motor has a first output shaft and a second output shaft, the first output shaft drives a first hydraulic pump, and an oil outlet of the first hydraulic pump is connected to an input end of the first main oil path; the second output shaft drives a second hydraulic pump, and an oil outlet of the second hydraulic pump is connected to an input end of the second main oil path; the first execution module is connected to an output end of the first main oil path; displacement of the first hydraulic pump is smaller than that of the second hydraulic pump; the switching control module is connected between the first main oil path and the second main oil path, and is configured to adjust a working pressure of the first main oil path and a movement speed of the first execution module by controlling on-off between the first main oil path and the second main oil path.

In another aspect, the present application provides a downhole device, including the hydraulic power system as described above.

The hydraulic power system provided by the present application can effectively adjust the working pressure of the first main oil path and the movement speed of the first execution module through technology of a single motor driving two pumps in cooperation with the switching control module, thus supporting effective control of force and speed according to requirements of downhole operations.

Other aspects will become apparent upon reading and understanding of the drawings and detailed description.

BRIEF DESCRIPTION OF THE DRAWINGS

The accompanying drawings are used to provide an understanding of technical solutions of the present application, and constitute a part of the specification. They are used together with the embodiments of the present application to explain the technical solutions of the present application, and do not constitute a restriction on the technical solutions of the present application.

DESCRIPTION OF REFERENCE NUMBERS

Figure 1:
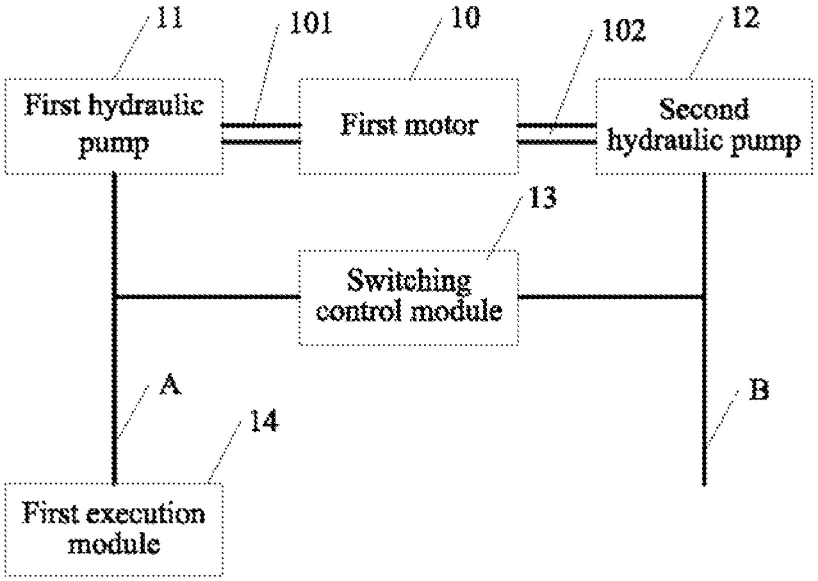
FIG. 1 is a schematic diagram of a hydraulic power system for a downhole device according to an embodiment of the present application.

10, M1—first motor; M2—second motor; M3—hydraulic motor; 11, B1—first hydraulic pump; 12, B2—second hydraulic pump; B3—third hydraulic pump; A—first main oil path; B—second main oil path; 13—switching control module; 14—first execution module; 15—second execution module; 16—pressure control module; K1~K16—safety relief valve; S1~S10—one-way valve; X1, X2—accumulator; R1~R10—hydraulic control one-way valve; G1, G2—thrust hydraulic cylinder; G3—spacer-insert hydraulic cylinder; G4—core thrust hydraulic cylinder; G5—reverse thrust hydraulic cylinder; G6—drilling hydraulic cylinder; L1~L8—pressure sensor; P1—P3—displacement sensor; Q—moving guide rail; 101—first output shaft; 102—second output shaft;

NC-1, NC-2, NO-3, NC-4, NC-5, NC-6, NC-7, NC-8, NO-9, NC-10, NO-11, NC-12, NO-13, NO-14, NC-15, NO-16, NC-17, NC-18, NC-19—electromagnetic reversing valve.

DETAILED DESCRIPTION

The present application describes a number of embodiments, but the description is exemplary, not restrictive, and it is apparent to those of ordinary skills in the art that there may be more embodiments and implementation schemes within the scope covered by the embodiments described in the present application. Although many possible combinations of features are shown in the drawings and discussed in the embodiments, many other combinations of disclosed features are also possible. Unless specifically limited, any feature or element of any embodiment may be used in combination with any other feature or element of any other embodiment or may replace any other feature or element of any other embodiment.

The present application includes and contemplates combinations of features and elements known to those of ordinary skills in the art. The disclosed embodiments, features and elements of the present application may also be combined with any conventional feature or element to form a unique inventive solution defined by the claims. Any feature or element of any embodiment may also be combined with a feature or an element from another inventive scheme to form another unique inventive scheme defined by the claims Therefore, it should be understood that any features shown and/or discussed in the present application may be realized individually or in any suitable combination. Therefore, the embodiments are not otherwise limited except those made according to the appended claims and their equivalents. Furthermore, various modifications and changes may be made within the protection scope of the appended claims.

FIG. 1 is a schematic diagram of a hydraulic power system for a downhole device according to an embodiment of the present application. As shown in FIG. 1, the hydraulic power system according to this embodiment includes a first motor 10, a first hydraulic pump 11, a second hydraulic pump 12, a first main oil path A, a second main oil path B, a switching control module 13 and a first execution module 14. The first motor 10 has a first output shaft 101 and a second output shaft 102, the first output shaft 101 drives the first hydraulic pump 11, and the second output shaft 102 drives the second hydraulic pump 12. An oil outlet of the first hydraulic pump 11 is connected to an input end of the fust main oil path A, and an oil outlet of the second hydraulic pump 12 is connected to an input end of the second main oil path B. Displacement of the first hydraulic pump 11 is smaller than that of the second hydraulic pump 12. The switching control module 13 is connected between the first main oil path A and the second main oil path B, and is configured to adjust a working pressure of the first main oil path A and a movement speed of the first execution module 14 by controlling on-off between the first main oil path A and the second main oil path B.

In an exemplary embodiment, a maximum working pressure of the first hydraulic pump 11 is greater than that of the second hydraulic pump 12. The switching control module 13 may also be configured to adjust a working pressure of the second main oil path B by controlling the on-off between the first main oil path A and the second main oil path B.

In an exemplary embodiment, the switching control module 13 may include a first control unit and a second control unit. The first control unit is connected between the first main oil path A and the second main oil path B and is configured to control the oil liquid from the first main oil path A to flow into the second main oil path B when the working pressure of the first main oil path A is greater than that of the second main oil path B. The second control unit is connected between the first main oil path A and the second main oil path B and is configured to control oil liquid from the second main oil path B to flow into the first main oil path A when the working pressure of the second main oil path B is greater than that of the first main oil path A.

In an exemplary embodiment, the first control unit may include a first reversing valve and a first one-way valve, wherein a first oil port of the first reversing valve is connected to a first connecting end of the first main oil path, a second oil port of the first reversing valve is connected to an oil inlet of the first one-way valve, and an oil outlet of the first one-way valve is connected to a first connecting end of the second main oil path. The first reversing valve is configured to control oil liquid from the first main oil path to flow into the second main oil path through the first reversing valve and the first one-way valve in sequence;

the second control unit may include a second reversing valve and a second one-way valve, wherein a first oil port of the second reversing valve is connected to the first connecting end of the second main oil path, a second oil port of the second reversing valve is connected to an oil inlet of the second one-way valve, and an oil outlet of the second one-way valve is connected to the first connecting end of the first main oil path. The second reversing valve is configured to control oil liquid from the second main oil path to flow into the first main oil path through the second reversing valve and the second one-way valve in sequence;

wherein the first connecting end of the first main oil path may be anywhere between the input end and an output end of the first main oil path, and the first connecting end of the second main oil path may be anywhere between the input end and an output end of the second main oil path.

In this exemplary embodiment, the first control unit may further include a first safety relief valve, wherein an oil inlet of the first safety relief valve is connected to the first oil port of the first reversing valve, and an oil outlet of the first safety relief valve is connected to an oil tank. The second control unit may further include a second safety relief valve, wherein an oil inlet of the second safety relief valve is connected to the first oil port of the second reversing valve, and an oil outlet of the second safety relief valve is connected to the oil tank. By arrangement of the safety relief valve, it is possible to prevent local pressure from rising and damaging the hydraulic valve due to thermal expansion of the hydraulic oil in the sealed hydraulic pipeline.

In an example, the first reversing valve and the second reversing valve may both be 3/2-way normally-off electromagnetic reversing valve. Herein, the first oil port of the first reversing valve is connected to the first connecting end of the first main oil path, the second oil port of the first reversing valve is connected to the oil inlet of the first one-way valve, and a third oil port of the first reversing valve is connected to the oil tank. The oil outlet of the first one-way valve is connected to the first connecting end of the second main oil path. The first oil port of the second reversing valve is connected to the first connecting end of the second main oil path, the second oil port of the second reversing valve is connected to the oil inlet of the second one-way valve, and a third oil port of the second reversing valve is connected to the oil tank. The oil outlet of the second one-way valve is connected to the first connecting end of the first main oil path.

It should be noted that, in this embodiment, the first oil port of the electromagnetic reversing valve may serve as the oil inlet connecting the electromagnetic reversing valve with an oil supply path of the system, which is labeled as port P. The second oil port may serve as the oil port connecting the electromagnetic reversing valve with an actuator element, which is labeled as port C. The third oil port may serve as an oil return port connecting the electromagnetic reversing valve with an oil return path of the system, which is labeled as port R.

In an exemplary embodiment, the first execution module 14 may include a first hydraulic cylinder and a control module for the first hydraulic cylinder. The control module for the first hydraulic cylinder is connected between the output end of the first main oil path and the first hydraulic cylinder, and is configured to control a piston rod of the first hydraulic cylinder to move under the working pressure of the first main oil path, and adjust a movement speed of the piston rod of the first hydraulic cylinder under the control of the switching control module 13.

The control module for the first hydraulic cylinder may include: a 3/2-way normally-on electromagnetic reversing valve, a 3/2-way normally-off electromagnetic reversing valve, a first hydraulic control one-way valve and a second hydraulic control one-way valve. A first oil port of the 3/2-way normally-off electromagnetic reversing valve is connected to the first main oil path, a second oil port of the 3/2-way normally-off electromagnetic reversing valve is connected to an oil outlet of the first hydraulic control one-way valve, a control oil path of the second hydraulic control one-way valve and a rodless chamber of the first hydraulic cylinder respectively, and a third oil port of the 3/2-way normally-off electromagnetic reversing valve is connected to the oil tank. A first oil port of the 3/2-way normally-on electromagnetic reversing valve is connected to the first main oil path, a second oil port of the 3/2-way normally-on electromagnetic reversing valve is connected to an oil outlet of the second hydraulic control one-way valve, a control oil path of the first hydraulic control one-way valve and a rod chamber of the first hydraulic cylinder respectively, and a third oil port of the 3/2-way normally-on electromagnetic reversing valve is connected to the oil tank. An oil inlet of the first hydraulic control unit valve is connected to an oil inlet of the second hydraulic control one-way valve, and both of them are connected to the oil tank.

In an exemplary embodiment, when the working pressure of the second main oil path B (for example, the working pressure of the second main oil path B is a maximum working pressure of the second hydraulic pump 12) is greater than that of the first main oil path A, the switching control module 13 controls oil liquid from the second main oil path B to flow into the first main oil path A, since the displacement of the first hydraulic pump 11 is less than that of the second hydraulic pump 12, the oil flow of the first main oil path A increases, such that a movement speed of the first execution module 14 connected on the first main oil path A can be increased. When the working pressure of the first main oil path A (for example, the working pressure of the first main oil path A is the maximum working pressure of the first hydraulic pump 11) is greater than that of the second main oil path B (for example, the working pressure of the second main oil path B is the maximum working pressure of the second hydraulic pump 12), the switching control module 13 controls the oil liquid from the first main oil path A to flow into the second main oil path B, at this time, the high-pressure oil liquid in the first main oil path A enters the second main oil path B, and the working pressure of the second main oil path B can be increased.

In an exemplary embodiment, the switching control module 13 may further be =figured to control the oil liquid in the second main oil path B to flow into the first main oil path A when the first hydraulic pump 11 fails, so as to provide a working pressure for the first main oil path A; or, to control the oil liquid in the first main oil path A to flow into the second main oil path B when the second hydraulic pump 12 fails, so as to provide a working pressure for the second main oil path B. In other words, the first hydraulic pump 11 and the second hydraulic pump 12 may back up each other. For example, when the first hydraulic pump 11 is damaged, the switching control module 13 may control the oil liquid from the second main oil path B to flow into the first main oil path A, to provide the working pressure of the first main oil path A. When the second hydraulic pump 12 is damaged, the switching control module 13 may control the oil liquid from the first main oil path A to flow into the second main oil path B, to provide the working pressure of the second group of oil paths B. In this way, even if one of the hydraulic pumps is damaged, the downhole device using the hydraulic power system of this embodiment can be ensured to work normally, thus improving the reliability and safety of the downhole device.

Figure 2:
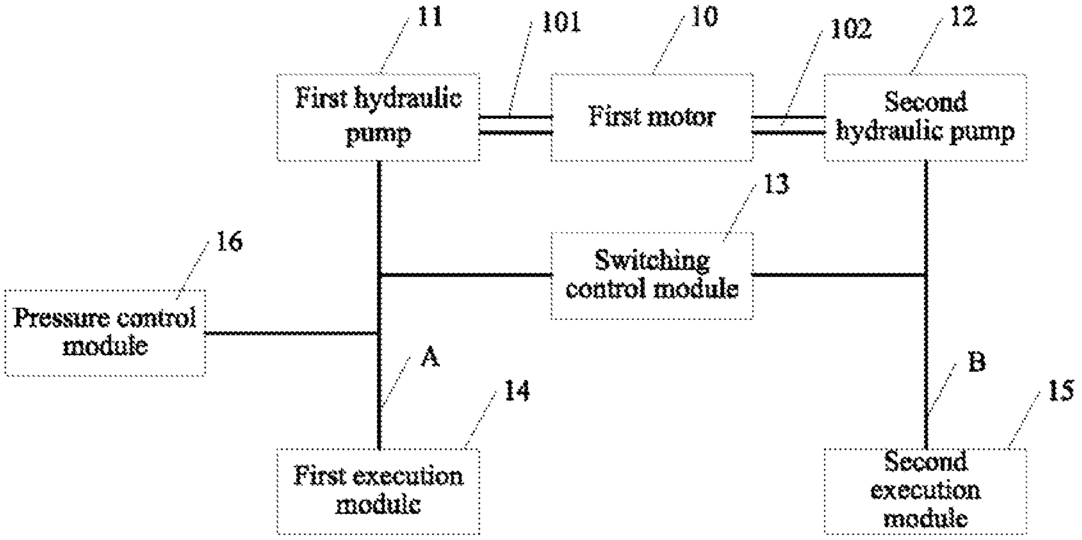
FIG. 2 is a schematic diagram of a hydraulic power system for a downhole device according to an exemplary embodiment of the present application.

FIG. 2 is a schematic diagram of a hydraulic power system for a downhole device according to an exemplary embodiment of the present application. Based on the hydraulic power system shown in FIG. 1, as shown in FIG. 2, the hydraulic power system of this embodiment may further include a pressure control module 16. The pressure control module 16 is connected to a second connecting end of the first main oil path A and configured to adjust the working pressure of the first main oil path A. The second connecting end of the first main oil path A may be anywhere between the first connecting end of the first main oil path A and the output end of the first main oil path A, and the first connecting end of the first main oil path A is connected to the switching control module 13.

In an exemplary embodiment, the pressure control module 16 may include multiple third reversing valves and safety relief valves in one-to-one correspondence with the third reversing valves, a first oil port of each of the third reversing valves is connected to the second connecting end of the first main oil path, and a second oil port of each of the third reversing valves is connected to the corresponding safety relief valve. The third reversing valve is configured to adjust the working pressure of the first main oil path by controlling on-off between the first main oil path and the corresponding safety relief valve. In an example, the third reversing valves may be 3/2-way normally-off electromagnetic reversing valves. The number of the third reversing valves and safety relief valves included in the pressure control module is not limited in the present application.

In this exemplary embodiment, by controlling the on-off between the first main oil path and the safety relief valves through the third reversing valves, different numbers of safety relief valves may be selected to communicate with the first main oil path, so that the working pressure of the first main oil path can be adjusted to achieve the control of the working pressure of the first execution module.

As shown in FIG. 2, the hydraulic power system according to this embodiment may further include a second execution module 15, the second execution module 15 includes a second hydraulic cylinder and a control module for the second hydraulic cylinder. The control module for the second hydraulic cylinder is connected between the output end of the second main oil path B and the second hydraulic cylinder and is configured to control a piston rod of the second hydraulic cylinder to move under the working pressure of the second main oil path B. An implementation of the control module for the second hydraulic cylinder may refer to that of the control module for the first hydraulic cylinder.

In an exemplary embodiment, the hydraulic power system may further include: a second motor, a third hydraulic pump and a third execution module which is connected to an oil outlet of the third hydraulic pump, wherein the second motor drives the third hydraulic pump, and the third hydraulic pump drives the third execution module. The hydraulic power system according to this embodiment may contain three hydraulic powers, which are driven by two independent motors, with the two independent motors working in cooperation, downhole operations with controllable force and speed can be allowed.

In an exemplary embodiment, the first motor and the second motor may be DC brushless motors and are powered by independent DC power supplies. By respectively powering the two motors with the two independent DC power supplies, independent speed control of the two motors can be achieved, so that the accuracy and reliability of the speed control can be increased.

The following description takes a downhole device as a coring instrument as an example. During coring, the coring instrument needs to perform actions such as thrust-fixing, bit drilling, core breaking, bit retracting, core thrusting, spacer inserting, core thrust rod retracting, reverse thrusting, etc., and their required power characteristics are quite different. Among them, the actions of thrusting, bit retracting, spacer inserting, core thrusting and the like need to be quick and powerful, while the bit drilling requires a low speed, but the force should be able to be accurately controlled.

In this example, in order to improve adaptability of the coring instrument to formations, the hydraulic power system includes three hydraulic powers, which are driven by two independent motors (i.e., the first motor and the second motor) respectively. The first motor drives the first hydraulic pump and the second hydraulic pump, and the second motor drives the third hydraulic pump. The first motor and the second motor may be DC brushless motors, such as high-temperature DC brushless motors with Hall feedback. In addition, by powering the first motor and the second motor with two independent DC power supplies, the independent modulation control of the two motors may be achieved, so that the two motors can work in coordination to achieve high-power coring operations. The power supplies for the first motor and the second motor may be controlled by software, thus control precision and accuracy are increased greatly.

Figure 3:
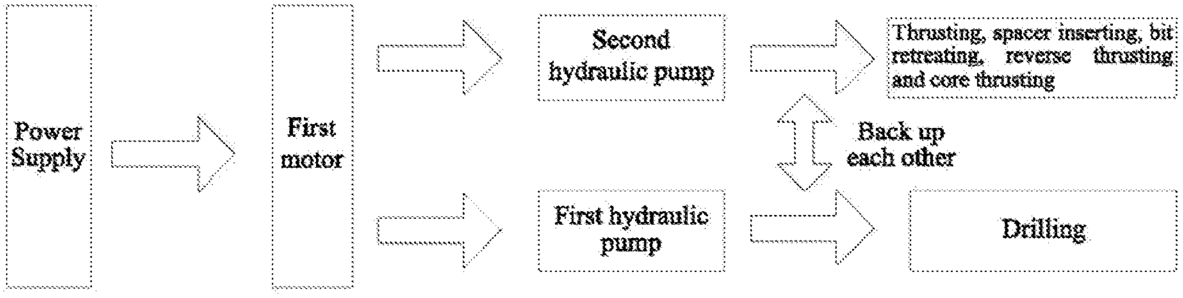
FIG. 3 is a schematic diagram of power transmission of a first motor in an exemplary embodiment of the present application.

FIG. 3 is a schematic diagram of power transmission of the first motor in an exemplary embodiment of the present application. As shown in FIG. 3, the first motor drives the first hydraulic pump and the second hydraulic pump to work. The first hydraulic pump and the second hydraulic pump may back up each other. The displacement of the first hydraulic pump is less than that of the second hydraulic pump, and the maximum working pressure of the first hydraulic pump is greater than that of the second hydraulic pump. Herein, the second hydraulic pump may be configured to provide power for actions such as thrust-fixing, spacer inserting, bit retreating, reverse thrusting and core thrusting, and the first hydraulic pump may be configured to provide power for drilling. During coring drilling, by controlling the rotational speed of the first motor, output flow of the first hydraulic pump may be controlled, and then by selection of different drilling pressures, the drilling speed and drilling force can be accurately controlled.

Figure 4:
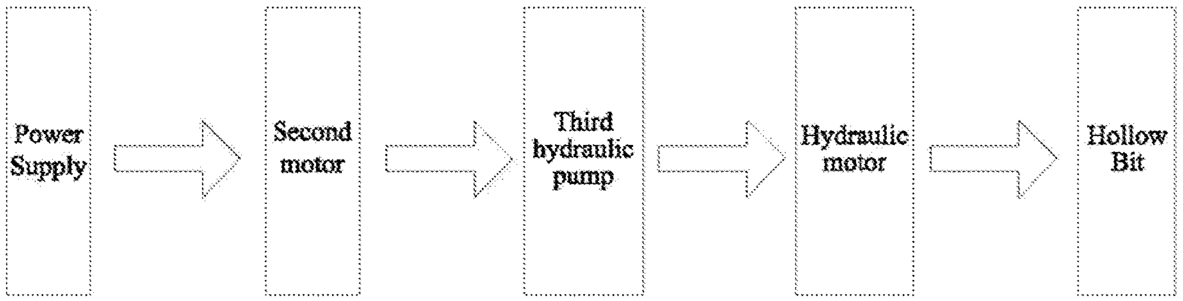
FIG. 4 is a schematic diagram of power transmission of a second motor in an exemplary embodiment of the present application.

FIG. 4 is a schematic diagram of power transmission of the second motor in an exemplary embodiment of the present application. As shown in FIG. 4, the second motor may drive the third hydraulic pump to rotate, thus driving the hydraulic motor, to directly drive the coring bit to work, which improves dynamic performance of the bit. Furthermore, by adjusting a power supply voltage of the ground DC power supply, a purpose of adjusting the rotational speed of the second motor (DC brushless motor) can be achieved, so that the rotational speed of the coring bit can be adjusted to improve the adaptability of the downhole device to the formation, and input power of the second motor is large, therefore output power of the bit is sufficient.

In this example, through the cooperation of the two motors and the three hydraulic pumps, controllable coring operation can be achieved, so as to improve the success getting rate of the coring operation and meet the requirements of operations in various complex formations. The working principle of the hydraulic power system during a coring operation is described in detail below.

Figure 5:
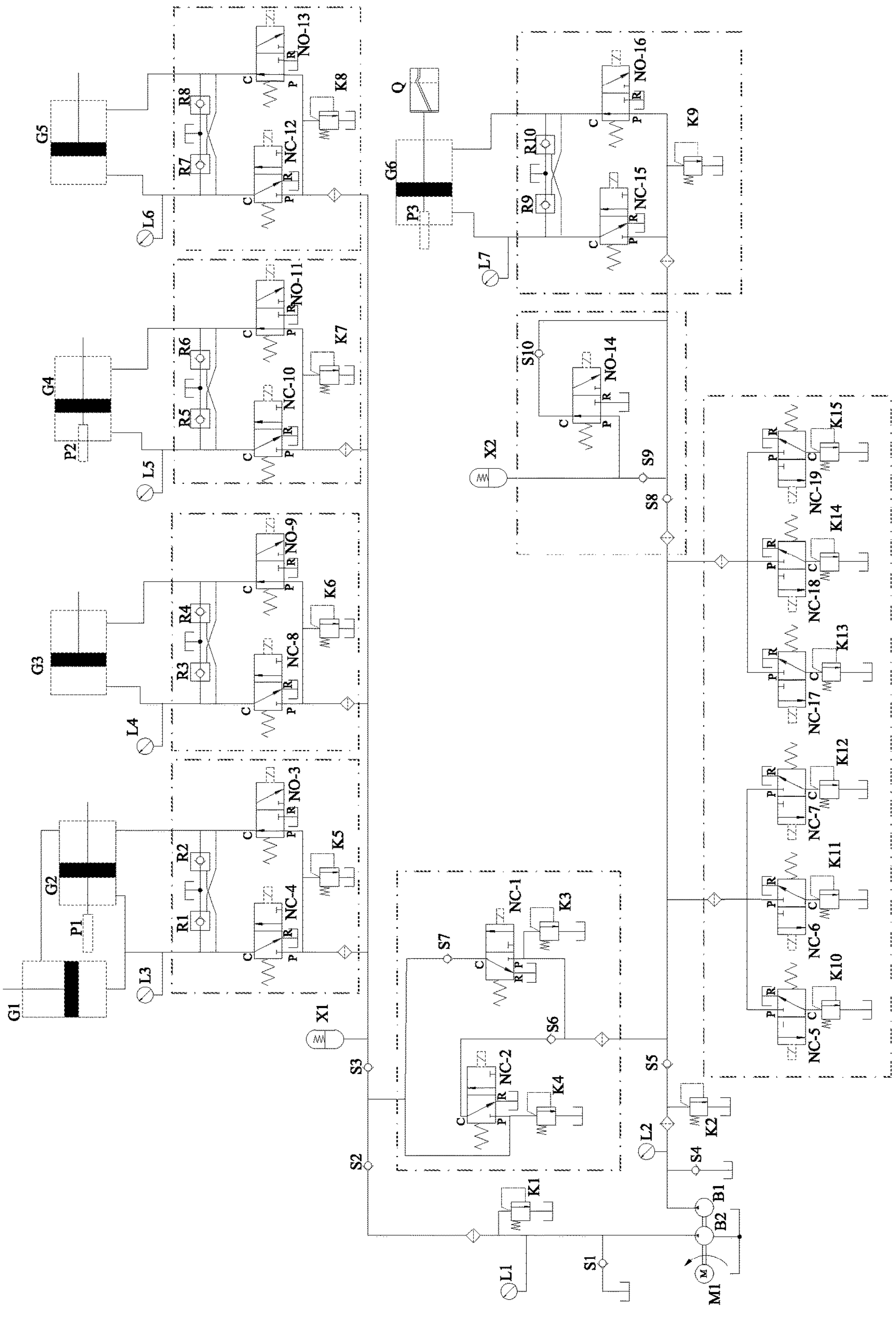
FIG. 5 is a schematic diagram of a working principle of a hydraulic power system according to an exemplary embodiment of the present application.

FIG. 5 is a diagram of a working principle of the hydraulic power system according to an embodiment of the present application. In this example, the first execution module includes a drilling hydraulic cylinder 66, a control module for the drilling hydraulic cylinder and an accumulator control module, wherein the first main oil path may be referred to simply as a drilling main oil path. The second execution module includes: thrust hydraulic cylinders G1, G2, a control module for thrust hydraulic cylinders, a spacer-insert hydraulic cylinder G3, a control module for the spacer-insert hydraulic cylinder, a core thrust hydraulic cylinder G4, a control module for the core thrust hydraulic cylinder, a reverse thrust hydraulic cylinder G5, and a control module for the reverse thrust hydraulic cylinder, wherein the second main oil path may be referred to simply as a thrust main oil path.

As shown in FIG. 5, the first motor M1 is a dual-output shaft motor, and two ends thereof respectively drive the first hydraulic pump (also called an extra small pump) B1 and the second hydraulic pump (also called a small pump) B2 to work simultaneously. A first output shaft of the first motor M1 is connected to a drive shaft of the first hydraulic pump B1, and a second output shaft of the first motor M1 is connected to a drive shaft of the second hydraulic pump B2. Displacement of the first hydraulic pump B1 is less than that of the second hydraulic pump B2, and a maximum working pressure of the first hydraulic pump B1 is greater than that of the second hydraulic pump 132. Oil inlets of the first hydraulic pump B1 and the second hydraulic pump B2 are respectively connected to the oil tank, an oil outlet of the first hydraulic pump B1 is connected to the first main oil path, and an oil outlet of the second hydraulic pump B2 is connected to the second main oil path.

As shown in FIG. 5, the oil outlet of the first hydraulic pump B1 is connected to an oil inlet of a safety relief valve K2 (corresponding to the aforementioned third safety relief valve), and an oil outlet of the safety relief valve K2 is connected to the oil tank. The working pressure of the first hydraulic pump B1 may be set with the safety relief valve K2. The oil outlet of the second hydraulic pump B2 is connected to an oil inlet of the safety relief valve K1 (corresponding to the aforementioned fourth safety relief valve), and an oil outlet of the safety relief valve K1 is connected to the oil tank. The working pressure of the second hydraulic pump B2 may be set with the safety relief valve K1.

As shown in FIG. 5, the oil outlet of the first hydraulic pump B1 is further connected to a pressure sensor L2, which is configured to detect the working pressure set by the safety relief valve K2. The oil outlet of the second hydraulic pump B2 is further connected to a pressure sensor L1, which is configured to detect the working pressure set by the safety relief valve K1.

As shown in FIG. 5, the oil outlet of the first hydraulic pump B1 is further connected to an oil inlet of a one-way valve S4, and an oil outlet of the one-way valve S4 is connected to the oil tank. The oil outlet of the second hydraulic pump B2 is further connected to an oil inlet of a one-way valve S1, and an oil outlet of the one-way valve S1 is connected to the oil tank. The oil outlet of the first hydraulic pump B1 is connected to an oil inlet of a one-way valve S5 through a filter. An oil outlet of the one-way valve S5 may be connected to the switching control module, the pressure control module and the first execution module. The oil outlet of the second hydraulic pump B2 is connected to an oil inlet of the one-way valve S2 through a filter, and an oil outlet of the one-way valve S2 is connected to an oil inlet of the one-way valve S3. The oil inlet of the one-way valve S3 may also be connected to the switching control module, and an oil outlet of the one-way valve S3 may be connected to the accumulator X1 and the second execution module.

As shown in FIG. 5, when the first motor M1 rotates reversely, the second hydraulic pump B2 may replenish oil through the one-way valve S1, be isolated from the switching control module through the one-way valve S2, and isolate the accumulator X1 through the one-way valve S3 (which prevents the hydraulic oil of the accumulator X1 from entering the first hydraulic pump B1, and the influence on the retraction of the thrust hydraulic cylinder when the accumulator X1 is released); the first hydraulic pump B2 may replenish oil through the one-way valve S4, and be isolated from subsequent oil paths through the one-way valve S5.

As shown in FIG. 5, when the first motor M1 rotates forward (i.e., during normal operation), the hydraulic oil liquid passes through the one-way valve S2 and the one-way valve S3, and enters the subsequent oil paths (including oil paths of the thrust hydraulic cylinder, spacer-insert hydraulic cylinder, core thrust hydraulic cylinder and reverse thrust hydraulic cylinder), so as to control actions of the corresponding hydraulic cylinders, and the hydraulic oil enters the subsequent oil paths (including oil path of the drilling hydraulic cylinder) through the one-way valve S5.

Figure 6:
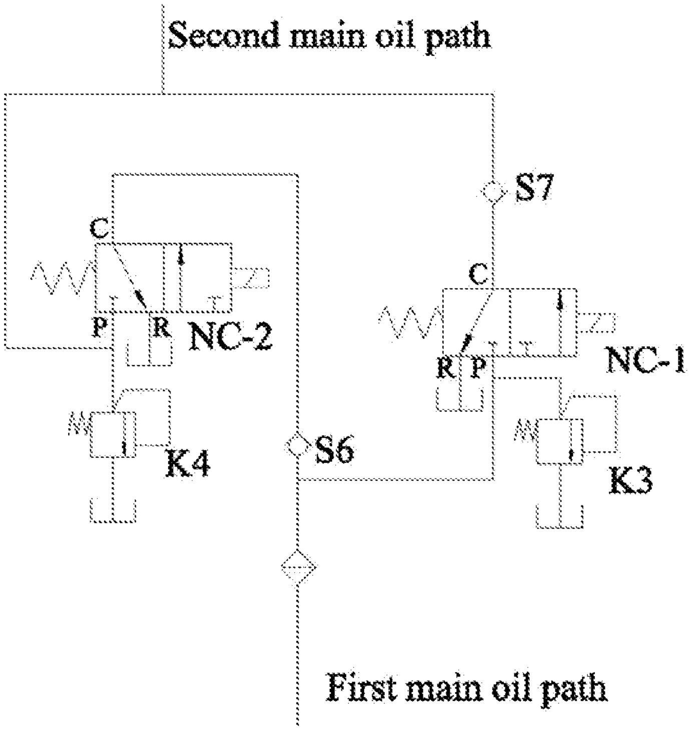
FIG. 6 is a schematic diagram of a switching control module according to an exemplary embodiment of the present application.

FIG. 6 is a schematic diagram of a switching control module according to an exemplary embodiment of the present application. As shown in FIG. 6, the switching control module includes electromagnetic reversing valves NC-1, NC-2, one-way valves S6 and S7, and safety relief valves K3 and K4. The electromagnetic reversing valves NC-1 and NC-2 are both 3/2-way normally-off electromagnetic reversing valves, a first oil port (port P) of the electromagnetic reversing valve NC-1 (corresponding to the first reversing valve mentioned above) is connected to the first connecting end of the first main oil path and the oil inlet of the safety relief valve K3 (corresponding to the first safety relief valve mentioned above), a second oil port (port C) of the electromagnetic reversing valve NC-1 is connected to the oil inlet of the one-way valve S7 (corresponding to the first one-way valve mentioned above), and a third oil port (port R) of the electromagnetic reversing valve NC-1 is connected to the oil tank. An oil outlet of the one-way valve S7 is connected to the first connecting end of the second main oil path. An oil outlet of the safety relief valve K3 is connected to the oil tank. A first oil port (port P) of the electromagnetic reversing valve NC-2 (corresponding to the second reversing valve mentioned above) is connected to the first connecting end of the second main oil path and an oil inlet of a safety relief valve K4 (corresponding to the second safety relief valve mentioned above), a second oil port (port C) of the electromagnetic reversing valve NC-2 is connected to the oil inlet of the one-way valve S6 (corresponding to the second one-way valve mentioned above), and a third oil port (port R) of the electromagnetic reversing valve NC-2 is connected to the oil tank. The oil outlet of the one-way valve S6 is connected to the first connecting end of the first main oil path, and an oil outlet of the safety relief valve K4 is connected to the oil tank.

Herein, the working pressure of the second hydraulic pump B2 is the maximum working pressure of the second hydraulic pump B2 after the thrust action is completed. When the drilling hydraulic cylinder G6 is operated, the working pressure of the drilling main oil path (the first main oil path) is lower than the maximum working pressure of the second hydraulic pump B2. When the electromagnetic reversing valve NC-2 is energized, high-pressure oil of the thrust main oil path (the second main oil path) enters the drilling main oil path through the electromagnetic reversing valve NC-2. Since the displacement of the second hydraulic pump B2 is larger than that of the first hydraulic pump B1, the hydraulic oil flow of the drilling main oil path increases, so that a movement speed of a piston rod of the drilling hydraulic cylinder may be increased, and the drilling speed or bit retreating speed can be increased. Furthermore, due to an isolation function of the one-way valve S3 and a pressure maintaining function of the accumulator X1, the thrust force of the thrust hydraulic cylinder is not affected.

Herein, when the thrust is on (the piston rod of the drilling hydraulic cylinder is in a refracted state), and the working pressure of the first hydraulic pump B1 is the maximum working pressure of the first hydraulic pump B1, and when the electromagnetic reversing valve NC-1 is energized, the high-pressure oil of the drilling main oil path (first main oil path) enters the thrust main oil path through the electromagnetic reversing valve NC-1. Since the maximum working pressure of the first hydraulic pump B1 is greater than that of the second hydraulic pump B2, the thrust pressure of the thrust hydraulic cylinder is the maximum working pressure of the first hydraulic pump B1, thus a thrust force of a thrust arm is increased, and the thrust arm thrusts the instrument more steadily. Due to the isolation function of the one-way valve S5, the drilling hydraulic cylinder and the accumulator X2 are not affected by actions of the thrust arm. Therefore, during coring operation, the device is firmly fixed by the thrust arm, and the cable may be loosened.

In this embodiment, by switching of the electromagnetic reversing valve NC-1, high-speed thrust can be achieved, the thrust pressure is relatively large, and power consumed by the first motor is relatively small. During the coring operation, the downhole device may be firmly fixed by providing a larger thrust force, so that the cable may be fully loosened. During drilling, by controlling the rotational speed of the first motor and the selection of drilling pressure, the drilling speed of the bit can be accurately controlled to prevent sticking of the bit. Herein, when high-speed drilling is required, with control by the electromagnetic reversing valve NC-2, the high-speed drilling can be achieved. When the bit needs to be quickly retracted, the maximum working pressure of the first hydraulic pump B1 is used to quickly retract the bit, and the force for retracting the bit is large, thus the downhole device can be prevented from being damaged. Furthermore, it is achievable that the first hydraulic pump B1 and the second hydraulic pump B2 may back up each other through the switching control module. When the first hydraulic pump B1 or the second hydraulic pump B2 is damaged, switching can be performed by the electromagnetic reversing valve NC-1 or NC-2 to ensure that the downhole device can work properly to ensure the reliability and safety of the downhole device.

Figure 7:
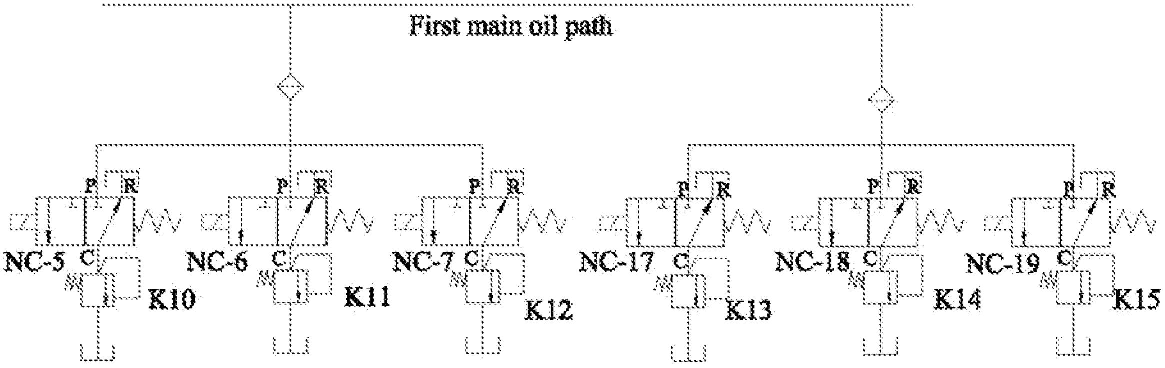
FIG. 7 is a schematic diagram of a pressure control module according to an exemplary embodiment of the present application.

FIG. 7 is a schematic diagram of a pressure control module according to the exemplary embodiment of the present application. Herein, a connection position of the pressure control module in the first main oil path may be anywhere between the connection position of the switching control module with the first main oil path and the output end of the first main oil path. As shown in FIG. 7, the pressure control module includes electromagnetic reversing valves NC-5, NC-6, NC-7, NC-17, NC-18 and NC-19 and safety relief valves K10, K11, K12, K13, K14 and K15. Herein, each electromagnetic reversing valve (corresponding to the third reversing valve mentioned above) is correspondingly connected to one safety relief valve. The electromagnetic reversing valves NC-5, NC-6, NC-7, NC-17, NC-18 and NC-19 are all 3/2-way normally-off electromagnetic reversing valves. Taking the electromagnetic reversing valve NC-5 as an example, a first oil port (port P) of the electromagnetic reversing valve NC-5 is connected to the first main oil path, a second oil port (port C) of the electromagnetic reversing valve NC-5 is connected to an oil inlet of the safety relief valve K10, and the third oil port (port R) of the electromagnetic reversing valve NC-5 is connected to the oil tank. An oil outlet of the safety relief valve K10 is connected to the oil tank. When the electromagnetic reversing valve NC-5 is de-energized, the high-pressure oil at the inlet of the electromagnetic reversing valve NC-5 is cut off and closed. When the electromagnetic reversing valve NC-5 is energized, the oil liquid in the first main oil path enters the safety relief valve K10 through the electromagnetic reversing valve NC-5 and returns to the oil tank. It should be noted that the number of the electromagnetic reversing valves and the safety relief valves included in the pressure control module is not limited in the present application.

In this embodiment, by selecting one or more of the electromagnetic reversing valves NC-5, NC-6, NC-7, NC-17, NC-18 and NC-19, the first main oil path may be selected to be communicated with different safety relief valves, so that the working pressure of the first main oil path can be controlled, which in turn controls the drilling pressure provided for the drilling hydraulic cylinder, so as to meet requirements of coring operations in different formations. For example, when a larger drilling force or bit retreating force is needed, the electromagnetic reversing valves NC-5, NC-6, NC-7, NC-17, NC-18 and NC-19 may all be de-energized, and the maximum working pressure of the first hydraulic pump may be used for drilling or bit retreating.

Figure 8:
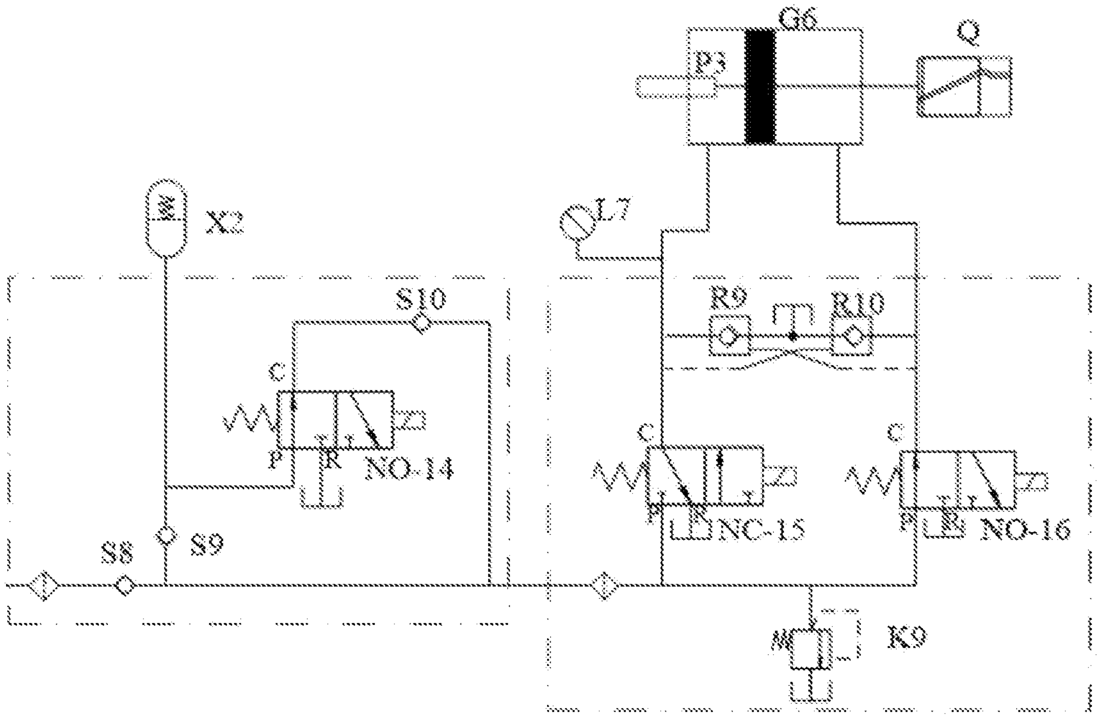
FIG. 8 is a schematic diagram of a control principle of a drilling hydraulic cylinder according to an exemplary embodiment of the present application.

FIG. 8 is a schematic diagram of a working principle of the drilling hydraulic cylinder in the exemplary embodiment of the present application. As shown in FIG. 8, the accumulator control module includes one-way valves S8, S9 and S10, and electromagnetic reversing valve NO-14. Herein, the electromagnetic reversing valve NO-14 is a 3/2-way normally-on electromagnetic reversing valve.

As shown in FIG. 8, a first oil port (port P) of the electromagnetic reversing valve NO-14 is connected to the accumulator X2 and an oil outlet of the one-way valve S9, a second oil port (port C) of the electromagnetic reversing valve NO-14 is connected to an oil inlet of one-way valve S10, and a third oil port (port R) of the electromagnetic reversing valve NO-14 is connected to the oil tank. An oil inlet of the one-way valve S9 is connected to an oil outlet of the one-way valve S8, and an oil inlet of the one-way valve S8 is connected to the output end of the first main oil path through a filter. The oil outlet of one-way valve S9 is further connected to the accumulator X2. An oil outlet of the one-way valve S10 is connected to the oil outlet of one-way valve S8.

Herein, before the coring operation, the high-pressure oil in the first main oil path may enter the accumulator X2 through the one-way valve S8 and the one-way valve S9. When the pressure reaches the maximum working pressure of the first hydraulic pump B1, the accumulator X2 is fully filled with hydraulic oil, and the electromagnetic reversing valve NO-14 is energized. When the accumulator X2 needs to be used, the electromagnetic reversing valve NO-14 is de-energized, and the high-pressure oil in the accumulator X2 passes through the electromagnetic reversing valve NO-14, then enters the control module for the drilling hydraulic cylinder through the one-way valve S10 to realize emergency retraction of the drilling hydraulic cylinder.

As shown in FIG. 8, the control module for the drilling hydraulic cylinder includes electromagnetic reversing valves NC-15, NO-16, hydraulic control one-way valves R9, R10 and a safety relief valve K9. Herein, the electromagnetic reversing valve NC-15 is a 3/2-way normally-off electromagnetic reversing valve, and the electromagnetic reversing valve NO-16 is a 3/2-way normally-on electromagnetic reversing valve.

As shown in FIG. 8, a first oil port (port P) of the electromagnetic reversing valve NC-15 is connected to oil outlets of the one-way valves S8 and S10, a second oil port (port C) of the electromagnetic reversing valve NC-15 is connected to an oil outlet of the hydraulic control one-way valve R9, a control oil path of the hydraulic control one-way valve R10 and a rodless chamber of drilling hydraulic cylinder G6, and a third oil port (port R) of the electromagnetic reversing valve NC-15 is connected to the oil tank. A first oil port (port P) of the electromagnetic reversing valve NO-16 is connected to the oil outlets of the one-way valves S8 and S10, a second oil port (port C) of the electromagnetic reversing valve NO-16 is connected to an oil outlet of the hydraulic control one-way valve R10, a control oil path of the hydraulic control one-way valve R9 and a rod chamber of the drilling hydraulic cylinder G6, and a third oil port (port R) of the electromagnetic reversing valve NO-16 is connected to the oil tank. An oil inlet of the hydraulic control unit valve R9 is connected to an oil inlet of the hydraulic control one-way valve R10, and both of them are connected to the oil tank. An oil inlet of the safety relief valve K9 is connected to the oil outlets of the one-way valves S8 and S10, and the oil outlet thereof is connected to the oil tank.

Herein, when the electromagnetic reversing valves NO-16 and NC-15 are de-energized (at normal position), the high-pressure oil enters the first oil port and enters the rod chamber of the drilling hydraulic cylinder G6 (the chamber on the right side of the drilling hydraulic cylinder G6) through the electromagnetic reversing valve NO-16. At the same time, the high-pressure oil passing through the electromagnetic reversing valve NO-16 opens the hydraulic control one-way valve R9, and the hydraulic oil in the rodless chamber of the drilling hydraulic cylinder (36 (the chamber on the left side of the drilling hydraulic cylinder G6) returns to the oil tank through the hydraulic control one-way valve R9. In this way, the drilling hydraulic cylinder may be retracted. For the electromagnetic reversing valve NC-15, the high-pressure oil inlet is closed, and part of the hydraulic oil in the rodless chamber of the drilling hydraulic cylinder enters the second oil port of the electromagnetic reversing valve NC-15 and returns to the oil tank.

Herein, when the electromagnetic reversing valves NO-16 and NC-15 are energized at the same time, the electromagnetic reversing valves NO-16 and NC-15 are reversed, and the high-pressure oil enters the first oil port and enters the rodless chamber of the drilling hydraulic cylinder G6 through the electromagnetic reversing valve NC-15. At the same time, the high-pressure oil passing through the electromagnetic reversing valve NC-15 opens the hydraulic control one-way valve R10, and the hydraulic oil in the rod chamber of the drilling hydraulic cylinder G6 returns to the oil tank through the hydraulic control one-way valve R10. In addition, the high-pressure oil at the inlet of the electromagnetic reversing valve NO-16 is cut off and closed, and part of the hydraulic oil in the rod chamber of the drilling hydraulic cylinder returns to the oil tank through the second oil port of the electromagnetic reversing valve NO-16. In this way, it is possible to control the drilling action.

In addition, when the electromagnetic reversing valve NO-16 is energized, but the electromagnetic reversing valve NC-15 is de-energized, the hydraulic control one-way valves R9 and R10 are closed reversely, and oil incoming at the left and right sides of the drilling hydraulic cylinder G6 is stopped. By communicating with the oil tanks with the electromagnetic reversing valves NO-16 and NC-15, the piston rod of the drilling hydraulic cylinder G6 is stopped, so that drilling can be stopped. The piston rod of the drilling hydraulic cylinder G6 drives a moving guide rail Q, to achieve stopping the bit from advancing.

As shown in FIG. 8, the safety relief valve K9 may play a protective role. Herein, when the drilling hydraulic cylinder does not operate for a long time, the hydraulic oil enclosed in the hydraulic pipeline will thermally expand, resulting in pressure increase. By unloading directly from the safety relief valve K9, overpressure protection may be carried out.

As shown in FIG. 8, a pressure sensor L7 is connected to an inlet of the rodless chamber of the drilling hydraulic cylinder G6, which may detect the drilling pressure of the drilling hydraulic cylinder G6. A displacement sensor P3 is connected to the piston rod of the drilling hydraulic cylinder G6, may move with the piston rod and detect a drilling depth.

The coring instrument using the hydraulic power system according to this exemplary embodiment can effectively control the force and speed of the drilling hydraulic cylinder through a technology of the single motor driving dual pumps and the switching control module, and the speed of switching is fast. By using the DC brushless motor, a large-scale stepless speed regulation can be achieved, and the speed regulation performance is good. By the pressure control module, the drilling pressure can be adjusted in a wide range, thus greatly improving the adaptability of the coring instrument to formations.

Next, the oil paths of the thrust hydraulic cylinder, the spacer-insert hydraulic cylinder, the core thrust hydraulic cylinder and the reverse thrust hydraulic cylinder on the second main oil path will be explained respectively.

Figure 9:
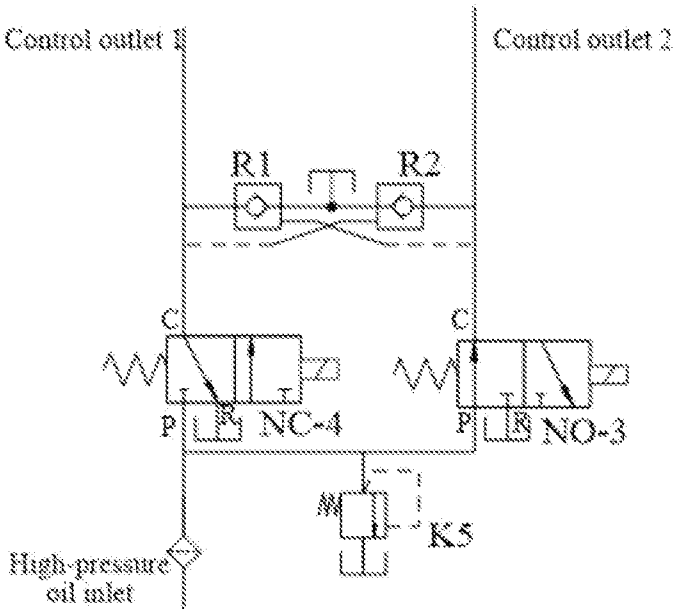
FIG. 9 is a schematic diagram of a control principle of a thrust hydraulic cylinder according to an exemplary embodiment of the present application.

FIG. 9 is a schematic diagram of a principle of a thrust hydraulic cylinder according to an exemplary embodiment of the present application. As shown in FIG. 9, a control module for the thrust hydraulic cylinder includes electromagnetic reversing valves NC-4, NO-3, hydraulic control one-way valves R1, R2 and a safety relief valve K5. The electromagnetic reversing valve NC-4 is a 3/2-way normally-off electromagnetic reversing valve, and the electromagnetic reversing valve NO-3 is a 3/2-way normally-on electromagnetic reversing valve.

As shown in FIG. 5 and FIG. 9, when the electromagnetic reversing valves NO-3 and NC-4 are de-energized (at normal position), high-pressure oil enters a high-pressure oil inlet from the second main oil path (hydraulic oil bus), enters the control outlet 2 through the electromagnetic reversing valve NO-3, and the high-pressure oil at the control outlet 2 enters the rod chambers of the thrust hydraulic cylinders (a chamber at the upper part of the thrust hydraulic cylinder G1 and a chamber at the right side of the thrust hydraulic cylinder G2). At the same time, the high-pressure oil passing through the electromagnetic reversing valve NO-3 opens the hydraulic control one-way valve R1, and the hydraulic oil in rodless chambers of the thrust hydraulic cylinders (a chamber at the lower part of the thrust hydraulic cylinder G1 and a chamber at the left side of the thrust hydraulic cylinder G2) returns to the oil tank through the hydraulic control one-way valve R1. In this way, it is possible to retract the two thrust hydraulic cylinders and retract the thrust arms. For the electromagnetic reversing valve NC-4, the high-pressure oil inlet is closed, and a part of the hydraulic oil in rod chambers of the thrust hydraulic cylinders enters the second oil port (port C) of the electromagnetic reversing valve NC-4 through a control outlet 1 and returns to the oil tank.

As shown in FIG. 5 and FIG. 9, when the electromagnetic reversing valves NO-3 and NC-4 are energized at the same time, the electromagnetic reversing valves NO-3 and NC-4 are reversed, and the high-pressure oil enters the high-pressure oil inlet from the hydraulic oil bus, enters the control outlet 1 through the electromagnetic reversing valve NC-4, and the high-pressure oil at the control outlet 1 enters rodless chambers of the thrust hydraulic cylinders (a chamber at the lower part of the thrust hydraulic cylinder G1 and a chamber at the left side of the thrust hydraulic cylinder G2). At the same time, the high-pressure oil passing through the electromagnetic reversing valve NC-4 opens the hydraulic control one-way valve R2, and the hydraulic oil in the rod chambers of the thrust hydraulic cylinders returns to the oil tank through the hydraulic control one-way valve R2. In addition, high-pressure oil at the inlet of the electromagnetic reversing valve NO-3 is cut off and closed, and a part of the hydraulic oil in the rod chambers of the thrust hydraulic cylinders enters the second oil port (port C) of the electromagnetic reversing valve NO-3 through the control outlet 2 and returns to the oil tank. In this way, the pistons of the two thrust hydraulic cylinders may be driven to extend out, and the thrust arms may thrust the well wall to complete an action of thrusting and fixing.

As shown in FIG. 9, the safety relief valve K5 may play a protective role. Herein, when the thrust hydraulic cylinders do not operate for a long time, the hydraulic oil enclosed in the hydraulic pipeline will thermally expand, resulting in pressure increase, by unloading directly from the safety relief valve K5, overpressure protection may be carried out.

As shown in FIG. 5 and FIG. 9, a pressure sensor L3 is connected to the control outlet 1, and may detect a supporting force of the thrust arm, so as to determine whether the thrust arm can thrust firmly. A position sensor P1 is connected to the piston of the thrust hydraulic cylinder G2. Herein, in the process of deploying or extending the thrust arm, the piston of the thrust hydraulic cylinder G2 pulls the displacement sensor P1 to move, the displacement sensor P1 may detect an extending distance of the thrust arm, thereby detecting the size of the well diameter.

As shown in FIG. 5, the control module for the spacer-insert hydraulic cylinder includes electromagnetic reversing valves NC-8, NO-9, hydraulic control one-way valves R3, R4 and a safety relief valve K6. Herein, the electromagnetic reversing valve NC-8 is a 3/2-way normally-off electromagnetic reversing valve, and the electromagnetic reversing valve NO-9 is a 3/2-way normally-on electromagnetic reversing valve.

As shown in FIG. 5, when the electromagnetic reversing valves NC-8 and NO-9 are de-energized (at normal position), high-pressure oil enters the high-pressure oil inlet from the hydraulic oil bus, and enters a rod chamber of the spacer-insert hydraulic cylinder G3 (a chamber at the right side of the spacer-insert hydraulic cylinder G3) through the electromagnetic reversing valve NO-9. At the same time, the hydraulic control one-way valve R3 is opened by the high-pressure oil passing through the electromagnetic reversing valve NO-9. In addition, high-pressure oil at the inlet of the electromagnetic reversing valve NC-8 is cut off and enclosed, the hydraulic oil in a rodless chamber of the spacer-insert hydraulic cylinder G3 returns to the oil tank through the electromagnetic reversing valve NC-8. The hydraulic control one-way valve R4 is closed, and hydraulic oil in the rodless chamber of the spacer-insert hydraulic cylinder returns to the oil tank through the hydraulic control one-way valve R3, so that a piston rod of the spacer-insert hydraulic cylinder is refracted.

As shown in FIG. 5, when the electromagnetic reversing valves NO-9 and NC-8 are energized at the same time, the electromagnetic reversing valves NO-9 and NC-8 are reversed, and the high-pressure oil enters the high-pressure oil inlet from the hydraulic oil bus, and enters the rodless chamber of the spacer-insert hydraulic cylinder G3 (the chamber at the left side of the spacer-insert hydraulic cylinder G3) through the electromagnetic reversing valve NC-8. At the same time, the hydraulic control one-way valve R4 is opened by the high-pressure oil passing through the electromagnetic reversing valve NC-8, and the hydraulic oil in the rod chamber of the spacer-insert hydraulic cylinder G3 returns to the oil tank through the hydraulic control one-way valve R4. In addition, high-pressure oil at the inlet of the electromagnetic reversing valve NO-9 is cut off and closed, the hydraulic oil in the rod chamber of the spacer-insert hydraulic cylinder G3 returns to the oil tank through the electromagnetic reversing valve NO-9, and the hydraulic control one-way valve R3 is closed, so that the piston rod of the spacer-insert hydraulic cylinder G3 extends out, and an action of spacer insertion is completed.

As shown in FIG. 5, the safety relief valve K6 may play a protective role. When the spacer-insert hydraulic cylinder G3 does not operate for a long time, when ambient temperature changes, the hydraulic oil enclosed in the hydraulic pipeline will thermally expand, resulting in pressure increase. By unloading directly from the safety relief valve K6, overpressure protection may be carried out.

As shown in FIG. 5, a pressure sensor IA is connected to an inlet of the rodless chamber of the spacer-insert hydraulic cylinder G3, and is configured to detect a force of the piston rod of the spacer-insert hydraulic cylinder G3 to determine whether the spacer is inserted in place.

As shown in FIG. 5, the control module for the core thrust hydraulic cylinder includes electromagnetic reversing valves NC-10, NO-11, hydraulic control one-way valves R5, R6 and a safety relief valve K7. The electromagnetic reversing valve NC-10 is a 3/2-way normally-off electromagnetic reversing valve, and the electromagnetic reversing valve NO-11 is a 3/2-way normally-on electromagnetic reversing valve. The connection relationship and control principle of the control module for the core thrust hydraulic cylinder are the same as those of the control module for the thrust hydraulic cylinder, which will not be repeated herein.

As shown in FIG. 5, a displacement sensor P2 is connected to a piston rod of the core thrust hydraulic cylinder G4, and is configured to measure a movement position of the piston rod of the core thrust hydraulic cylinder G3. A pressure sensor L5 is connected to an inlet of the rodless chamber of the core thrust hydraulic cylinder G4, and is configured to detect the pressure of the rodless chamber, so that a core thrust force can be calculated, and thus whether the coring is successful can be determined according to the magnitude and change of the core thrust force.

As shown in FIG. 5, the control module for the reverse thrust hydraulic cylinder includes electromagnetic reversing valves NC-12, NO-13, hydraulic control one-way valves R7, R8 and a safety relief valve K8. The electromagnetic reversing valve NC-12 is a 3/2-way normally-off electromagnetic reversing valve, and the electromagnetic reversing valve NO-13 is a 3/2-way normally-on electromagnetic reversing valve. The connection relationship and control principle of the control module for the reverse thrust hydraulic cylinder are the same as those of the control module for the thrust hydraulic cylinder, which will not be repeated herein.

As shown in FIG. 5, a pressure sensor L6 is connected to an inlet of the rodless chamber of the reverse thrust hydraulic cylinder G5, and is configured to detect the pressure of the rodless chamber.

As shown in FIG. 5, the second main oil path is provided with an accumulator X1. In case of emergency, the hydraulic power system is completely de-energized, the first motor M1 stops working, and all electromagnetic reversing valves are de-energized, then the one-way valve S3 may isolate the oil path of the accumulator X1 from the second main oil path, and the high-pressure oil in the accumulator X1 may enter the main oil paths of the thrust hydraulic cylinder, the core thrust hydraulic cylinder, the spacer-insert hydraulic cylinder, and the reverse thrust hydraulic cylinder, so that all the hydraulic cylinders are retracted.

Figure 10:
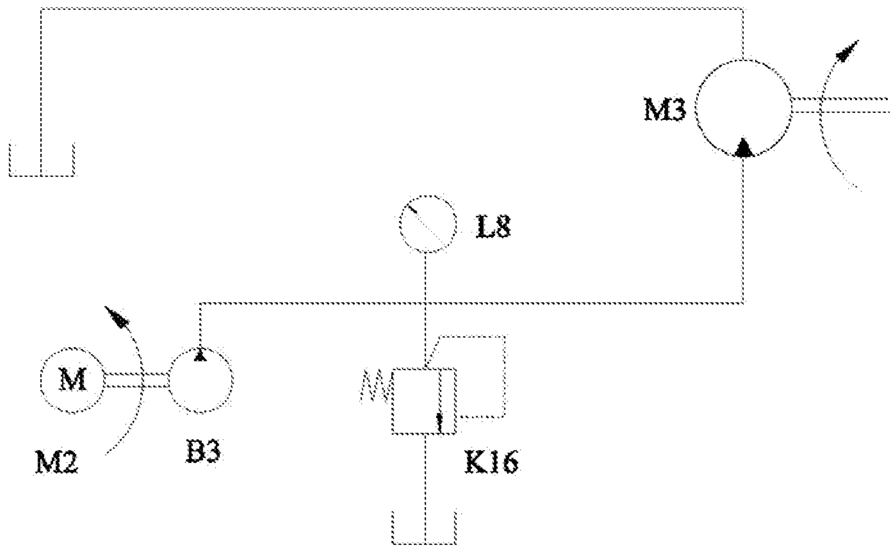
FIG. 10 is a schematic diagram of a control principle of a rotational speed of a bit according to an exemplary embodiment of the present application.

FIG. 10 is a schematic diagram of a control principle of a rotational speed of the bit according to the exemplary embodiment of the present application. As shown in FIG. 10, the hydraulic power system of this exemplary embodiment may further include a second motor M2 and a third hydraulic pump B3, wherein an output shaft of the second electrode M2 is connected to a drive shaft of the third hydraulic pump B3, and an oil outlet of the third hydraulic pump B3 is connected to a hydraulic motor M3. The second motor M2 drives the third hydraulic pump B3, and high-pressure oil of the second hydraulic pump B3 directly drives the hydraulic motor M3 to rotate, and an output shaft of the hydraulic motor M3 may drive the bit to rotate. By adjusting the rotational speed of the second motor, the rotational speed of the bit can be controlled.

Herein, the oil outlet of the third hydraulic pump B3 is further connected to an oil inlet of the safety relief valve K16, and an oil outlet of the safety relief valve K16 is connected to the oil tank. The safety relief valve K16 is configured to set the working pressure of the third hydraulic pump B3. A pressure sensor L8 is also connected to the oil outlet of the third hydraulic pump B3, and is configured to detect the working pressure of the third hydraulic pump set by the safety relief valve K16.

In this embodiment, because the second motor M2 independently drives the third hydraulic pump B3, and the high-pressure oil directly drives the hydraulic motor M3 and drives the bit to rotate, power of the second motor is no longer shunted, the power of the bit is relatively sufficient, and the rotational speed of the bit may be independently controlled according to requirements of coring operations. Moreover, the second motor may be a DC brushless motor, by adjusting a power supply voltage of a ground large DC power supply, the purpose of adjusting the rotational speed of the DC brushless motor can be achieved, so that the rotational speed of the coring bit may be adjusted to improve the adaptability to formations, and input power of the second motor is large, the output power of the bit is sufficient.

In this embodiment, the drilling pressure, the drilling speed and the rotational speed of the bit are independently controlled. Herein, by controlling the energization of electromagnetic reversing valves NC-5, NC-6, NC-7, NC-17, NC-18 and NC-19, different safety relief valves are selected to control the working pressure of the drilling hydraulic cylinder. The piston rod of the drilling hydraulic cylinder produces different thrusts to push the drilling moving guide rail, which may apply different drilling pressures to the bit, so as to meet the requirements of drilling coring on different formations. By adjusting the rotational speed of the first motor, the movement speed of the piston rod of the drilling hydraulic cylinder can be adjusted, and the forward and backward speed of the bit may be further controlled by the moving guide rail, by on-off control of the electromagnetic reversing valve NC-2 in the switching control module, the movement speed of the piston rod of the drilling hydraulic cylinder can be switched between high speed and low speed. By using the second motor to independently control the rotational speed of the bit, the independent and accurate control of the rotational speed of the bit can be achieved, and the power is sufficient. Moreover, in the hydraulic power system according to this embodiment, safety relief valves are designed and installed in the enclosed hydraulic pipelines. In this way, in a downhole high-temperature environment, the hydraulic oil enclosed in the hydraulic pipelines thermally expands, the pressure thereof may be relieved from the safety relief valves, thus preventing local pressure from rising and damaging hydraulic valves due to the thermal expansion of the hydraulic oil inside the sealed hydraulic pipelines.

In addition, an embodiment of the present application further provides a downhole device, such as a coring instrument, which includes the hydraulic power system as described above.

What is claimed is:

1. A hydraulic power system for a downhole device, comprising:

a first motor, a first hydraulic pump, a second hydraulic pump, a first main oil path, a second main oil path, a switching control module and a first execution module;

wherein the first motor has a first output shaft and a second output shaft, wherein the first output shaft drives the first hydraulic pump, and an oil outlet of the first hydraulic pump is connected to an input end of the first main oil path; the second output shaft drives the second hydraulic pump, and an oil outlet of the second hydraulic pump is connected to an input end of the second main oil path; the first execution module is connected to an output end of the first main oil path;

displacement of the first hydraulic pump is smaller than displacement of the second hydraulic pump; and the switching control module is connected between the first main oil path and the second main oil path, and is configured to adjust a working pressure of the first main oil path and a movement speed of the first execution module by controlling on-off between the first main oil path and the second main oil path ;.

wherein a maximum working pressure of the first hydraulic pump is greater than a maximum working pressure of the second hydraulic pump; and the switching control module is further configured to adjust a working pressure of the second main oil path by controlling the on-off between the first main oil path and the second main oil path;

wherein the switching control module comprises a first control unit and a second control unit;

the first control unit is connected between the first main oil path and the second main oil path and configured to control oil liquid from the first main oil path to flow into the second main oil path when the working pressure of the first main oil path is greater than the working pressure of the second main oil path; and the second control unit is connected between the first main oil path and the second main oil path, and configured to control oil liquid from the second main oil path to flow into the first main oil path when the working pressure of the second main oil path is greater than the working pressure of the first main oil path;

wherein the first control unit comprises a first reversing valve and a first one-way valve, wherein a first oil port of the first reversing valve is connected to a first connecting end of the first main oil path, a second oil port of the first reversing valve is connected to an oil inlet of the first one-way valve, and an oil outlet of the first one-way valve is connected to a first connecting end of the second main oil path; the first reversing valve is configured to control oil liquid from the first main oil path to flow into the second main oil path through the first reversing valve and the first one-way valve in sequence; and the second control unit comprises a second reversing valve and a second one-way valve, wherein a first oil port of the second reversing valve is connected to the first connecting end of the second main oil path, a second oil port of the second reversing valve is connected to an oil inlet of the second one-way valve, and an oil outlet of the second one-way valve is connected to the first connecting end of the first main oil path; the second reversing valve is configured to control oil liquid from the second main oil path to flow into the first main oil path through the second reversing valve and the second one-way valve in sequence;

wherein the first connecting end of the first main oil path is anywhere between the input end and the output end of the first main oil path; the first connecting end of the second main oil path is anywhere between the input end and an output end of the second main oil path.

2. The hydraulic power system according to claim 1, wherein the switching control module is further configured to control oil liquid from the second main oil path to flow into the first main oil path when the first hydraulic pump fails, to provide a working pressure for the first main oil path; or, to control oil liquid from the first main oil path to flow into the second main oil path when the second hydraulic pump fails, to provide a working pressure for the second main oil path.

3. The hydraulic power system according to claim 1, wherein the first control unit further comprises a first safety relief valve, an oil inlet of the first safety relief valve is connected to the first oil port of the first reversing valve, and an oil outlet of the first safety relief valve is connected to an oil tank; and the second control unit further comprises a second safety relief valve, an oil inlet of the second safety relief valve is connected to the first oil port of the second reversing valve, and an oil outlet of the second safety relief valve is connected to an oil tank.

4. The hydraulic power system according to claim 1, further comprising a pressure control module which is connected to a second connecting end of the first main oil path and is configured to adjust the working pressure of the first main oil path; and the second connecting end of the first main oil path is anywhere between the first connecting end of the first main oil path and the output end of the first main oil path.

5. The hydraulic power system according to claim 4, wherein the pressure control module comprises a plurality of third reversing valves and safety relief valves in one-to-one correspondence with the third reversing valves respectively, a first oil port of each of the third reversing valves is connected to the second connecting end of the first main oil path, and a second oil port of each of the third reversing valves is connected to a corresponding safety relief valve, each third reversing valve is configured to adjust the working pressure of the first main oil path by controlling on-off between the first main oil path and the corresponding safety relief valve.

6. The hydraulic power system according to claim 1, wherein the first execution module comprises a first hydraulic cylinder and a control module for the first hydraulic cylinder, the control module for the first hydraulic cylinder is connected between the output end of the first main oil path and the first hydraulic cylinder, and is configured to control a piston rod of the first hydraulic cylinder to move under the working pressure of the first main oil path, and adjust a movement speed of the piston rod of the first hydraulic cylinder under the control of the switching control module.

7. The hydraulic power system according to claim 6, wherein the control module for the first hydraulic cylinder comprises a 3/2-way normally-on electromagnetic reversing valve, a 3/2-way normally-off electromagnetic reversing valve, a first hydraulic control one-way valve and a second hydraulic control one-way valve;

wherein a first oil port of the 3/2-way normally-off electromagnetic reversing valve is connected to the output end of the first main oil path, a second oil port of the 3/2-way normally-off electromagnetic reversing valve is connected to an oil outlet of the first hydraulic control one-way valve, a control oil path of the second hydraulic control one-way valve and a rodless chamber of the first hydraulic cylinder respectively, and a third oil port of the 3/2-way normally-off electromagnetic reversing valve is connected to an oil tank;

a first oil port of the 3/2-way normally-on electromagnetic reversing valve is connected to the output end of the first main oil path, a second oil port of the 3/2-way normally-on electromagnetic reversing valve is connected to an oil outlet of the second hydraulic control one-way valve, a control oil path of the first hydraulic control one-way valve and a rod chamber of the first hydraulic cylinder respectively, and a third oil port of the 3/2-way normally-on electromagnetic reversing valve is connected to an oil tank; and an oil inlet of the first hydraulic control one-way valve is connected to an oil inlet of the second hydraulic control one-way valve, and both of the oil inlets of the first and second hydraulic control one-way valves are connected to an oil tank.

8. The hydraulic power system according to claim 6, further comprising a second execution module, wherein the second execution module comprises a second hydraulic cylinder and a control module for the second hydraulic cylinder, the control module for the second hydraulic cylinder is connected between an output end of the second main oil path and the second hydraulic cylinder and is configured to control a piston rod of the second hydraulic cylinder to move under a working pressure of the second main oil path.

9. The hydraulic power system according to claim 1, further comprising a third safety relief valve and a fourth safety relief valve, wherein the third safety relief valve is connected to the oil outlet of the first hydraulic pump, and the fourth safety relief valve is connected to the oil outlet of the second hydraulic pump, the third safety relief valve is configured to control a working pressure of the first hydraulic pump, and the fourth safety relief valve is configured to control a working pressure of the second hydraulic pump.

10. The hydraulic power system according to claim 1, further comprising a second motor, a third hydraulic pump, and a third execution module connected to an oil outlet of the third hydraulic pump, wherein the second motor drives the third hydraulic pump, and the third hydraulic pump drives the third execution module.

11. The hydraulic power system according to claim 10, wherein the first motor and the second motor are DC brushless motors and are powered by independent DC power supplies.

12. A downhole device comprising the hydraulic power system according to claim 1.

* * * * *